April 19, 1927.  
G. C. STACY  
1,625,576  
TELESCOPING SUCTION PIPE  
Filed March 9, 1926
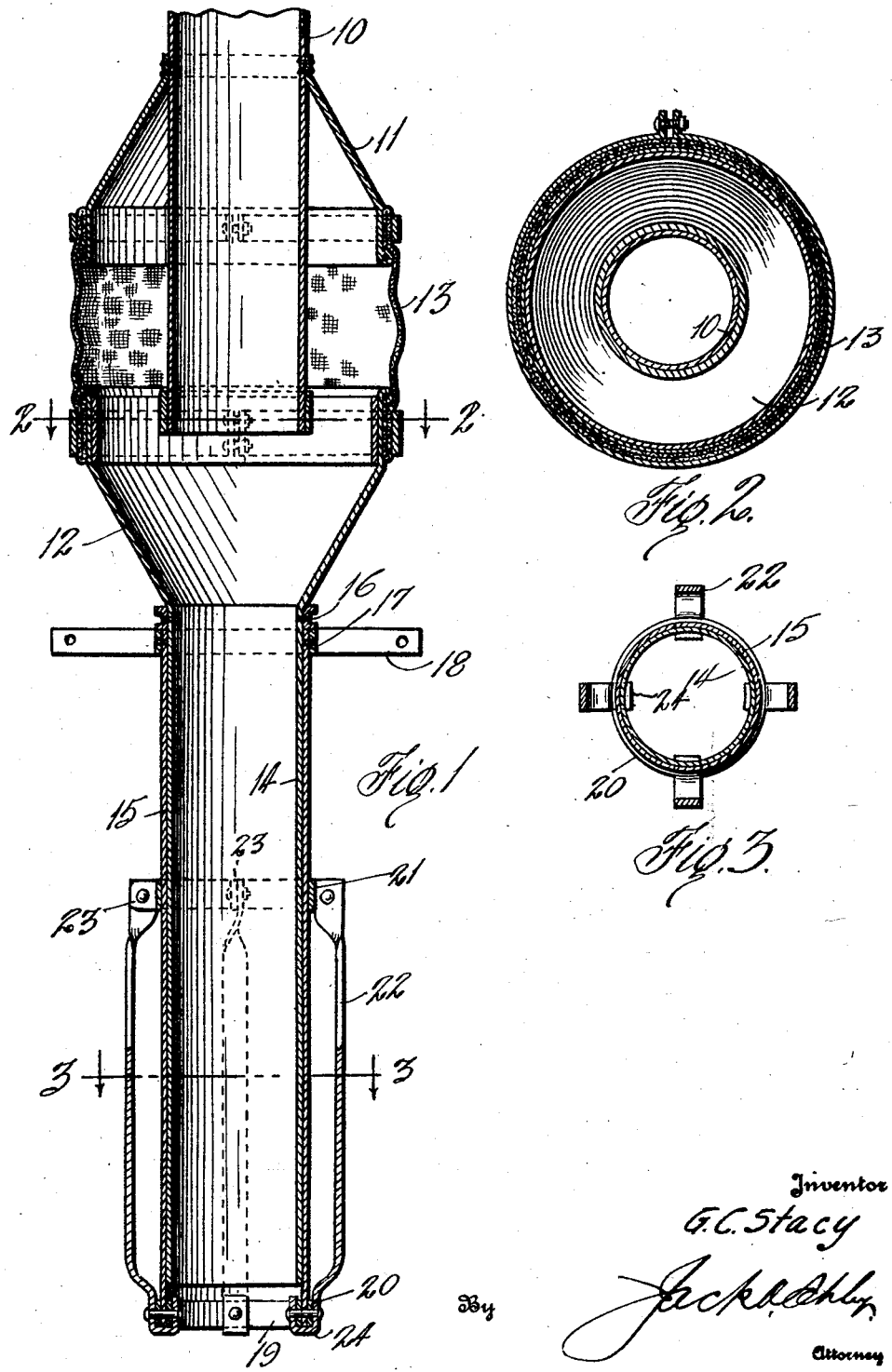

Patented Apr. 19, 1927.

1,625,576

UNITED STATES PATENT OFFICE.

GROVER C. STACY, OF DALLAS, TEXAS.

TELESCOPING SUCTION PIPE.

Application filed March 9, 1926. Serial No. 93,430.

This invention relates to new and useful improvements in telescoping suction pipes.

The object of the invention is to provide telescoping suction pipes for the lower end of a cotton elevator with certain novel features of construction, whereby the "telescope" so called, may be more readily and easily handled without injury to the operator.

Another object of the invention is to provide the sleeve with longitudinal members constituting both handles and guards.

A particular object of the invention is to provide a stop ring or collar at the top of the conducting pipe for taking the thrust and limiting the upward movement of the sleeve; and also for preventing the reinforcing ring at the bottom of the sleeve from engaging the lower end of the pipe, thereby preventing injury to the fingers of the operator should he have hold of said reinforcing ring when the sleeve reached the end of its upward movement.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a vertical sectional view of a device constructed in accordance with my invention, Fig. 2 is a cross-sectional view taken on the line 2—2 of Fig. 1, and Fig. 3 is a cross-sectional view taken on the line 3—3 of Fig. 1.

In the drawings the numeral 10 designates the usual stationary tubular conductor of a pneumatic conveyor. I have shown a boot comprising an upper member 11 and a lower member 12 connected by a flexible sleeve 13, such as is illustrated in my co-pending application, Serial No. 93,429, but it is to be understood that my invention may be constructed for use with any suitable boot or flexible joint.

In carrying out the invention I secure a tubular conductor or pipe 14 to the lower end of the conical member 12 and mount on said pipe a telescoping sleeve 15. At the upper end of the pipe, preferably contiguous to the intersection of the pipe with the member 12, is mounted a stop ring 16 which is suitably fastened around the pipe. A carrier ring 17 is fastened around the upper end of the sleeve and has the usual oppositely directed supporting arms 18 to which the counter-balances (not shown) are suitably attached. It will be seen that the stop ring 16 will take the upward thrust of the sleeve and limit the upward movement of said sleeve.

The sleeve has internal and external reinforcing rings 19 and 20 respectively fastened on its lower end. A supporting ring 21 is mounted on the sleeve above its lower end and equally spaced handle bars 22 have inwardly bent ears 23 at their upper end fastened to said ring. The lower ends of the handle bars are provided with inwardly directed U-shaped stirrups 24 engaging around the rings 19 and 20 and under the bottom of the sleeve. The stirrups are offset from the bars and with the ears space the said bars from the sleeve so that they may be easily grasped. These bars not only serve as handles but any obstruction, such as a wagon, in passing the telescope, can not injure the sleeve and pipe but will engage said bars which will act as guards.

It will be seen that when the upper end of the sleeve is in engagement with the ring 16, the ring 19 and the stirrups 24 will be spaced sufficiently from the lower end of the pipe 14 to prevent mashing the fingers of the operator therebetween. The sleeve 15 being mounted on the outside of the pipe 14 and having a smooth sliding fit thereon, will preclude hanging of the sleeve during its telescoping action and will prevent the accumulation of matter therebetween.

Various changes in the size and shape of the different parts, as well as modifications and alterations may be made within the scope of the appended claims.

What I claim is:

1. In an elevator telescope, a depending pipe, a sleeve telescoping on the pipe, a stop ring at the upper end of the pipe receiving the thrust of the sleeve, a reinforcing member in the lower end of the sleeve, a supporting ring surrounding the sleeve, guard bars having their upper ends secured to the supporting ring and offset from the sleeve, and stirrups on the lower ends of the bars engaging around the lower end of the sleeve and the reinforcing member therein.

2. In an elevator telescope, a depending pipe, a sleeve telescoping on the pipe, a stop on the pipe above the sleeve for receiving the upward thrust of the sleeve, a reinforcing member at the lower end of the sleeve, a supporting ring surrounding and fixed to the sleeve, and guard bars having their upper ends secured to the ring and their lower ends secured to the lower end of the sleeve.

In testimony whereof I affix my signature.

GROVER C. STACY.